US011888436B2

(12) United States Patent
Li et al.

(10) Patent No.: US 11,888,436 B2
(45) Date of Patent: Jan. 30, 2024

(54) FLOATING SOLAR SYSTEM

(71) Applicant: LW Engineering LLC, Sugar Land, TX (US)

(72) Inventors: Wenjun Li, Houston, TX (US); Yilin Li, Houston, TX (US); Wanjing Li, Houston, TX (US)

(73) Assignee: LW Engineering LLC, Sugar Land, TX (US)

( * ) Notice: Subject to any disclaimer, the term of this patent is extended or adjusted under 35 U.S.C. 154(b) by 104 days.

(21) Appl. No.: 17/096,547

(22) Filed: Nov. 12, 2020

(65) Prior Publication Data
US 2022/0149777 A1 May 12, 2022

(51) Int. Cl.
*H02S 20/00* (2014.01)
*H02S 30/10* (2014.01)
*B63B 35/44* (2006.01)
*H02S 40/36* (2014.01)
*H02S 40/10* (2014.01)

(52) U.S. Cl.
CPC .............. *H02S 30/10* (2014.12); *B63B 35/44* (2013.01); *H02S 20/00* (2013.01); *H02S 40/10* (2014.12); *H02S 40/36* (2014.12); *B63B 2035/4453* (2013.01)

(58) Field of Classification Search
CPC ....... H01L 31/00–078; Y20E 10/50–60; H02S 20/00–32; B63B 2035/4453
See application file for complete search history.

(56) References Cited

U.S. PATENT DOCUMENTS

| | | | | |
|---|---|---|---|---|
| 3,090,339 A | * | 5/1963 | Carr | B63B 5/24 114/61.1 |
| 2011/0308563 A1 | * | 12/2011 | Shufflebotham | H01L 31/048 156/60 |
| 2015/0204583 A1 | * | 7/2015 | Stephan | F24S 25/67 403/375 |
| 2019/0393826 A1 | * | 12/2019 | Lai | H02S 30/20 |
| 2020/0053996 A1 | * | 2/2020 | Xue | B63B 45/02 |
| 2020/0215500 A1 | * | 7/2020 | Burton | B01F 35/2211 |
| 2020/0385093 A1 | * | 12/2020 | Gordon | B63B 35/50 |

FOREIGN PATENT DOCUMENTS

| | | | |
|---|---|---|---|
| CN | 201871455 | * | 6/2011 |
| CN | 207488278 | * | 6/2018 |
| CN | 111357704 | * | 7/2020 |
| FR | WO2014/202847 | * | 12/2014 |

(Continued)

OTHER PUBLICATIONS

Chen et al. CN110498017 with English translation (Year: 2019).*

(Continued)

*Primary Examiner* — Bach T Dinh
(74) *Attorney, Agent, or Firm* — Timothy T. Wang; Ni, Wang & Massand, PLLC

(57) ABSTRACT

A floating solar system, comprising a floating base having, a buoyance and a lower base frame coupled to the buoyance, a center frame coupled to the lower base frame, an anchor coupled to the lower base frame, a plurality of solar panels affixed to the lower base frame and the center frame to provide electrical power, a lightning rod coupled to the center frame and a lightning rod cap coupled to the lightning rod.

23 Claims, 18 Drawing Sheets

(56) References Cited

FOREIGN PATENT DOCUMENTS

| GB | 2230204 | * | 10/1990 |
| KR | 100983375 | * | 9/2010 |
| KR | 20110102732 | * | 9/2011 |
| KR | 102109502 | * | 5/2020 |
| NL | WO2020214023 | * | 10/2020 |

OTHER PUBLICATIONS

Wang et al. CN 108909945 with English translation (Year: 2018).*
Han et al. CN 106887288 with English translation (Year: 2017).*
Mao et al. CN 110182320 with English translation (Year: 2019).*
Zhang et al. CN 202332883 with English translation (Year: 2012).*
Suzhou CN 111239356 with English translation (Year: 2020).*
LV CN 102487876 with English translation (Year: 2012).*
Yasuoka JPH0724449 with English translation (Year: 1995).*

* cited by examiner

FLOATING SOLAR SYSTEM

TECHNICAL FIELD

The instant disclosure relates to a floating solar system, specifically a floating solar system for aeration and fountains.

BACKGROUND

Solar panels mounted on land-based fixtures to provide power to water feature applications are used for most off-grid systems. They may be secured to areas which have less blocking of sun light, since power output is greatly affected by shading from surrounding trees and other obstacles. Land-based systems are affected by the distance from the mounting pole to the device this affects the length of power cords and or air hose lines. They are more costly and less efficient than floating solar panel systems.

Current floating solar panel systems may be tilted and southerly facing. This it is not efficient or economical for low wattage off grid applications.

Current floating solar systems may have difficulty maintaining an exact location due to wind and water loads. In some cases, the higher center of gravity of solar panels may lead to rigid mounting to the water feature floor. Open areas around the solar panel make it natural habitats for wild animals, which may affect the sunlight and may lead to the electro-mechanical system damage.

Existing diffuser assemblies mostly attaches commercially available diffuser to weighted base. Without correct design features, the floating base may be flipped over by water currents due to lack of consideration towards hydrodynamic forces. A low profile flat base can also be buried under mud. All these factors can block the air bubble outlet. Air aeration from the bottom of water can stir up accumulated poisonous materials that effect fish.

SUMMARY

In one example a floating solar system, comprising a floating base having, a buoyance and a tower base frame coupled to the buoyance, a center frame coupled to the lower base frame, an anchor coupled to the lower base frame, a plurality of solar panels affixed to the lower base frame and the center frame to provide electrical power, a lightning rod coupled to the center frame and a lightning rod cap coupled to the lightning rod.

BRIEF DESCRIPTION OF THE DRAWINGS

Embodiments of the disclosure will now be described, by way of example, with reference to the accompanying drawings, wherein.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name hut not in function.

In the following discussion and in the claims, the terms "including" and "comprising" are used in an open-ended fashion, and thus should be interpreted to mean "including, but not limited . . . ." Also, the term "couple" or "couples" is intended to mean either an indirect or direct connection. Thus, if a first device couples to a second device that connection may be through a direct connection or through an indirect connection via other devices and connections.

A floating solar system is described which may be assembled and deployed to an area water feature where sunlight is available. The system may be secured to a buoyance by a mounting frame having a lower base frame and a center frame which is vertical and mounted to the lower base frame. The buoyance, lower base frame and center frame (mounting frame) comprise the floating base. In various embodiments of the system, three or four triangle or trapezoid shaped solar panels tilted less than 40 degrees and facing 120 or 90 degrees apart may be mounted to the mounting frame. In one embodiment, the solar panels may be joined between an upper cap mounted to the center frame and connected to the lower base frame to create enclosed area for electro-mechanical components and control systems. Solar panels may be connected in serial or parallel to derive power regardless the orientation and movement of the floating base.

In one embodiment, a floating solar system having three solar panels ma be connected in parallel to balance the power output of the system. For a system with four solar panels, opposite sides of solar panels may be connected in parallel first and then in series.

In one embodiment the floating solar system may have a lower base frame anchored or secured with weighted block. Extra cable length may allow movement or variations in water level.

In one embodiment the floating solar system may have panels tilted less than 40 degrees. This configuration allows an open center area for electro-mechanical and control systems. Solar panels tilted less than 40 degrees, and preferably 20 to 30 degrees, may optimize power output and center area space.

A top cap may be secured to an upper end of the solar panels to act as roof for center area. The cap may also act as a support plate for electro-mechanical system enclosure and controller mounting.

Figure 1:
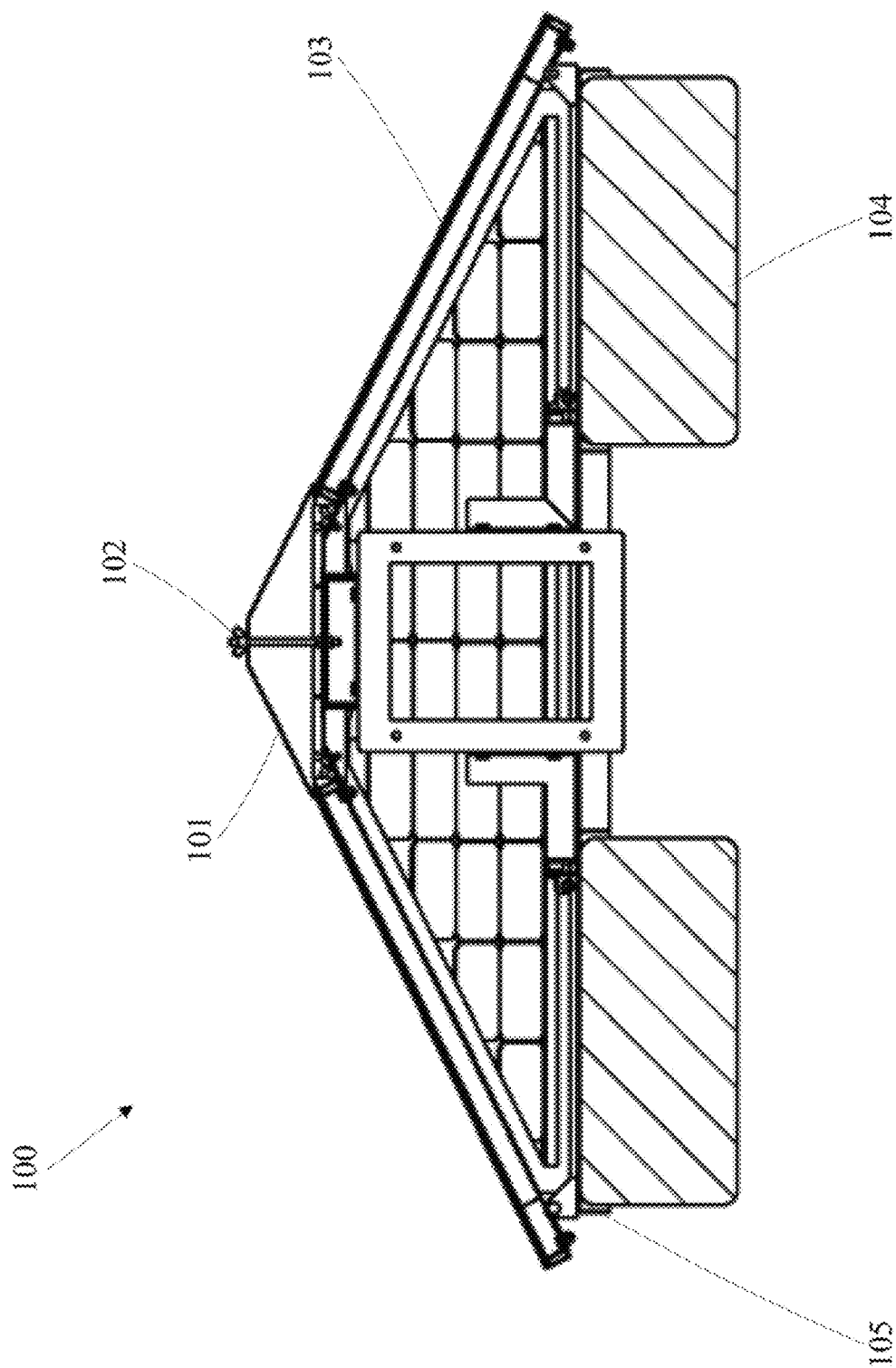
FIG. 1 shows an example embodiment of the floating solar system having an aerator according to example embodiments.

A floating solar system lower frame may provide support to the solar panels. The lower frame may be secured to the buoyance and anchor cables and support the electro-mechanical enclosure FIG. 1 depicts an example of the internal components of the floating solar system 100. A top cover cap 101 may be secured with a bolt 102 to the center frame that is coupled to the lower base frame 105. Solar panels 103 may be tilted to a specific angle and secured to the lower base frame 105. The weight of floating solar system 100 may be supported by buoyance 104.

A floating solar system may include a floating base having, a buoyance and a lower base frame coupled to the buoyance, a center frame coupled to the lower base frame, an anchor coupled to the lower base frame, a plurality of solar panels affixed to the lower base frame and the center frame to provide electrical power, a lightning rod coupled to the center frame and a lightning rod cap coupled to the lightning rod. A shape of the floating base may be one of square and round. The system may include a top plate coupled to the center frame and at least one electromechanical encasement coupled to the center frame.

Figure 2:
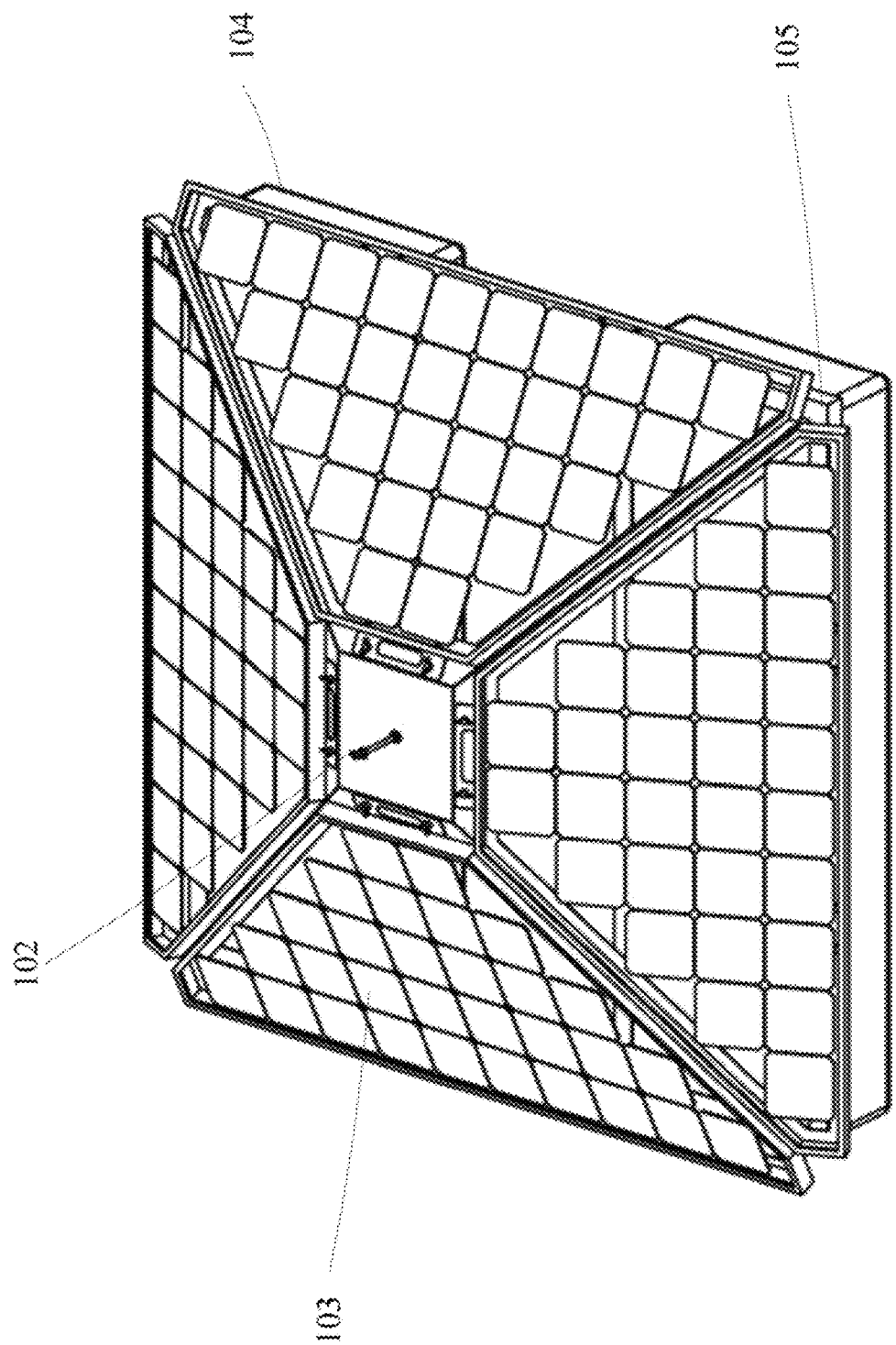
FIG. 2 depicts a first example of the upper mounting cap of the floating solar system according to example embodiments.

FIG. 2 depicts a 3-D view of floating system with four solar panels 103. The bolt 102 is coupled to the center frame that is coupled to the lower base frame 105. The solar panels are 90 degrees apart and may have an upper end secured via bolts to the lower base frame 105. The weight of floating solar system may be supported by buoyance 104.

Figure 3:
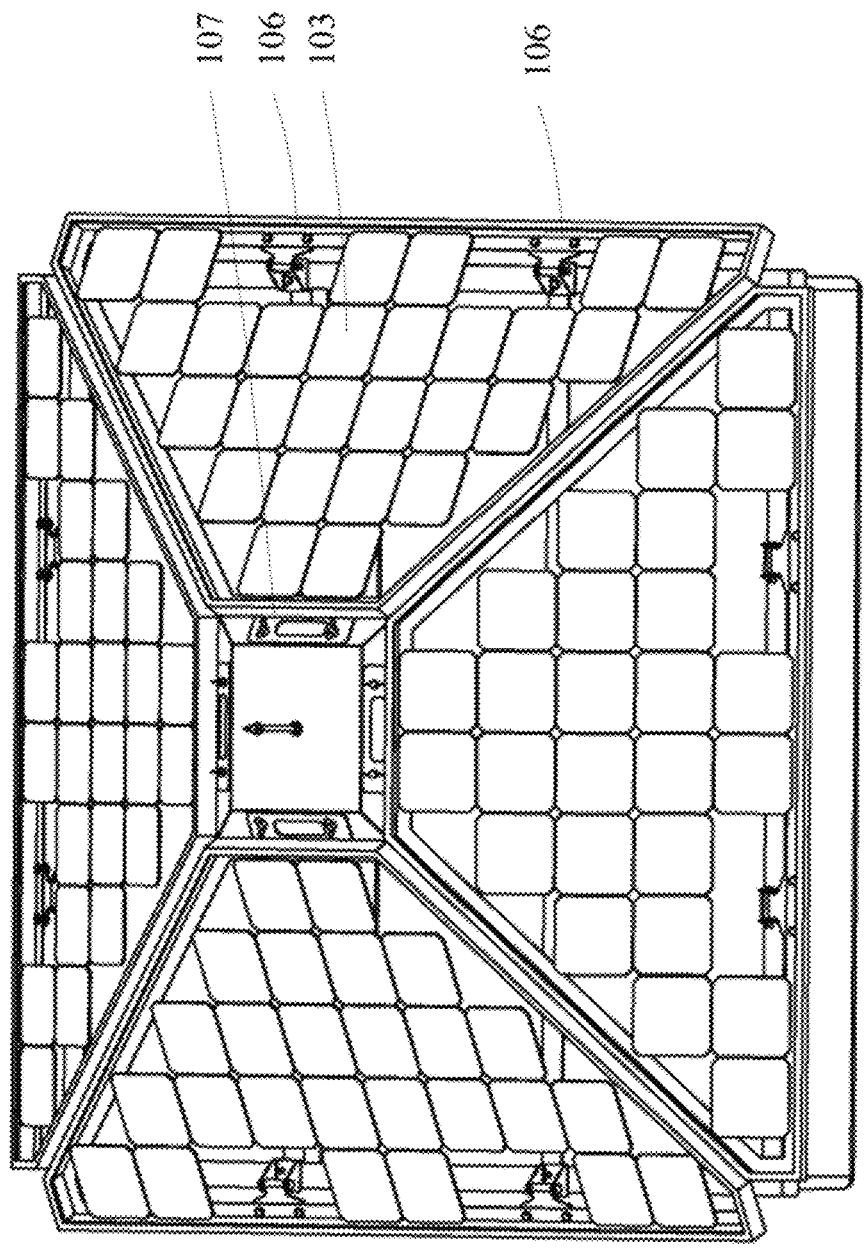
FIG. 3 depicts a second example of the upper mounting cap of the floating solar system according to example embodiments.

FIG. 3 depicts the solar panel support points, namely an upper bracket 107 and a pair of lower hinges 106 for mounting the solar panel 103 to the lower base frame 105. The solar panels are hinged together to facilitate installation and removal. At least one of the solar panels may be hinged to the lower base frame and bolted to the top plate and a shape of the solar panels may be one of rectangular, triangular, and trapezoidal. The solar panels may form a pyramidal shape of at least one of three and four sides.

Figure 4:
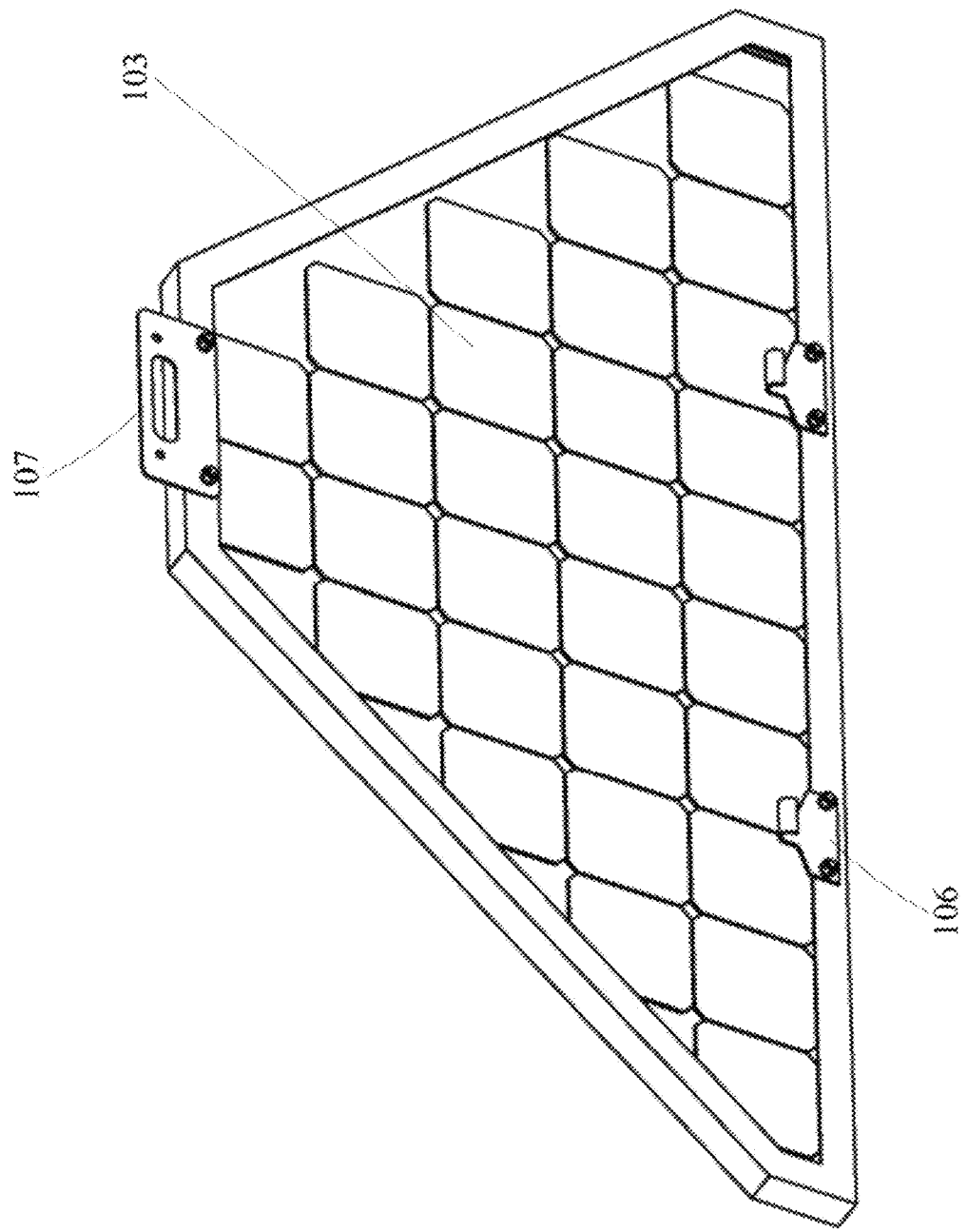
FIG. 4 depicts an example solar panel section of the floating solar system according to example embodiments.

FIG. 4 is a rear view of the solar panel 103. The solar panel has an upper bracket 107 for coupling to the center frame or top cap and a lower hinge 106 for mounting to the lower base frame.

Figure 5:
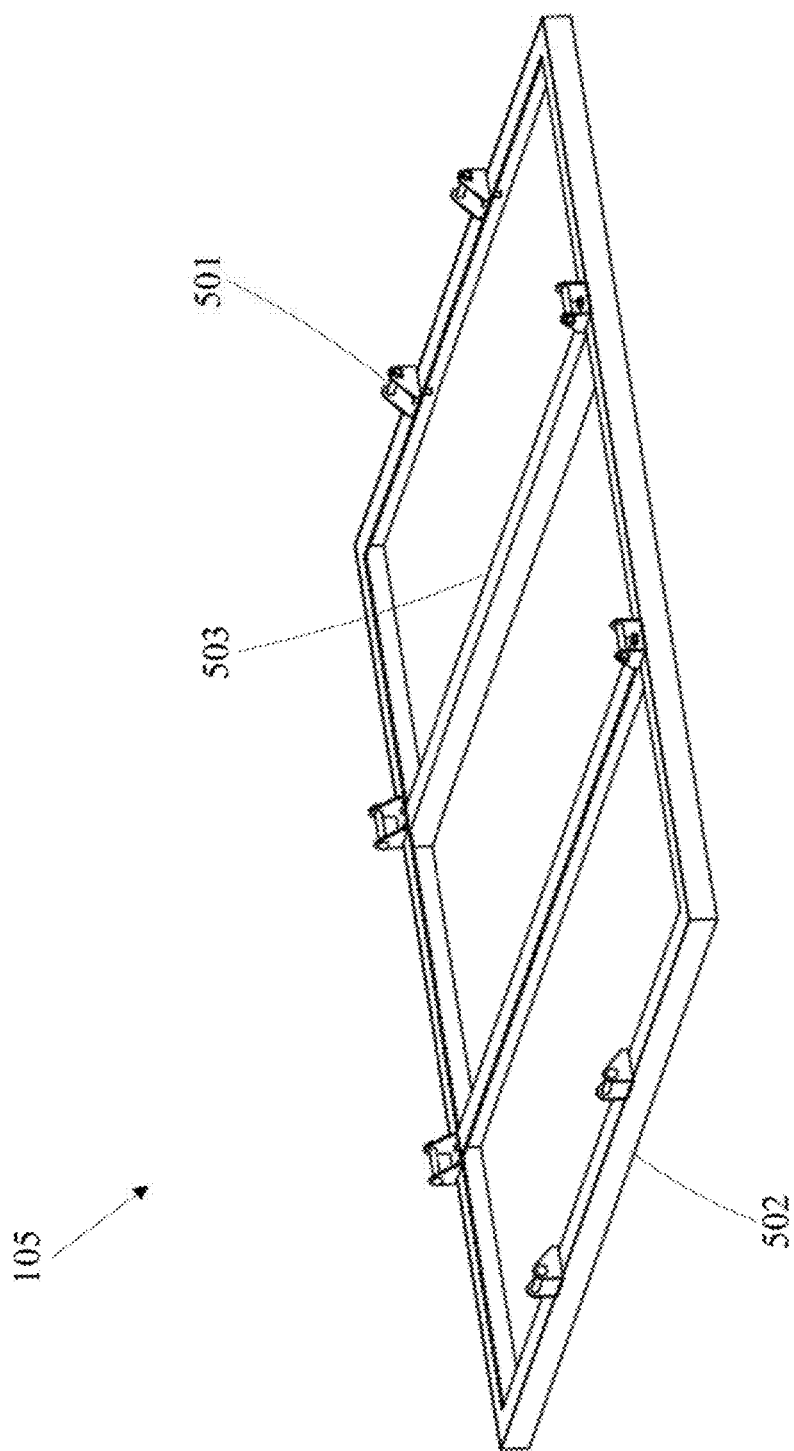
FIG. 5 shows an example lower mounting frame of the floating solar system according to example embodiments.

FIG. 5 is the 3D view of the lower base frame of the lower base frame 105. The lower base frame 105 includes an outer frame 502 that may be aluminum or stainless steel and an inner frame portion 503 that may be aluminum or stainless steel. Solar panel hinge support pins 501 may be mounted to the outer frame 502 and may be welded or bolted to the outer frame.

Figure 6:
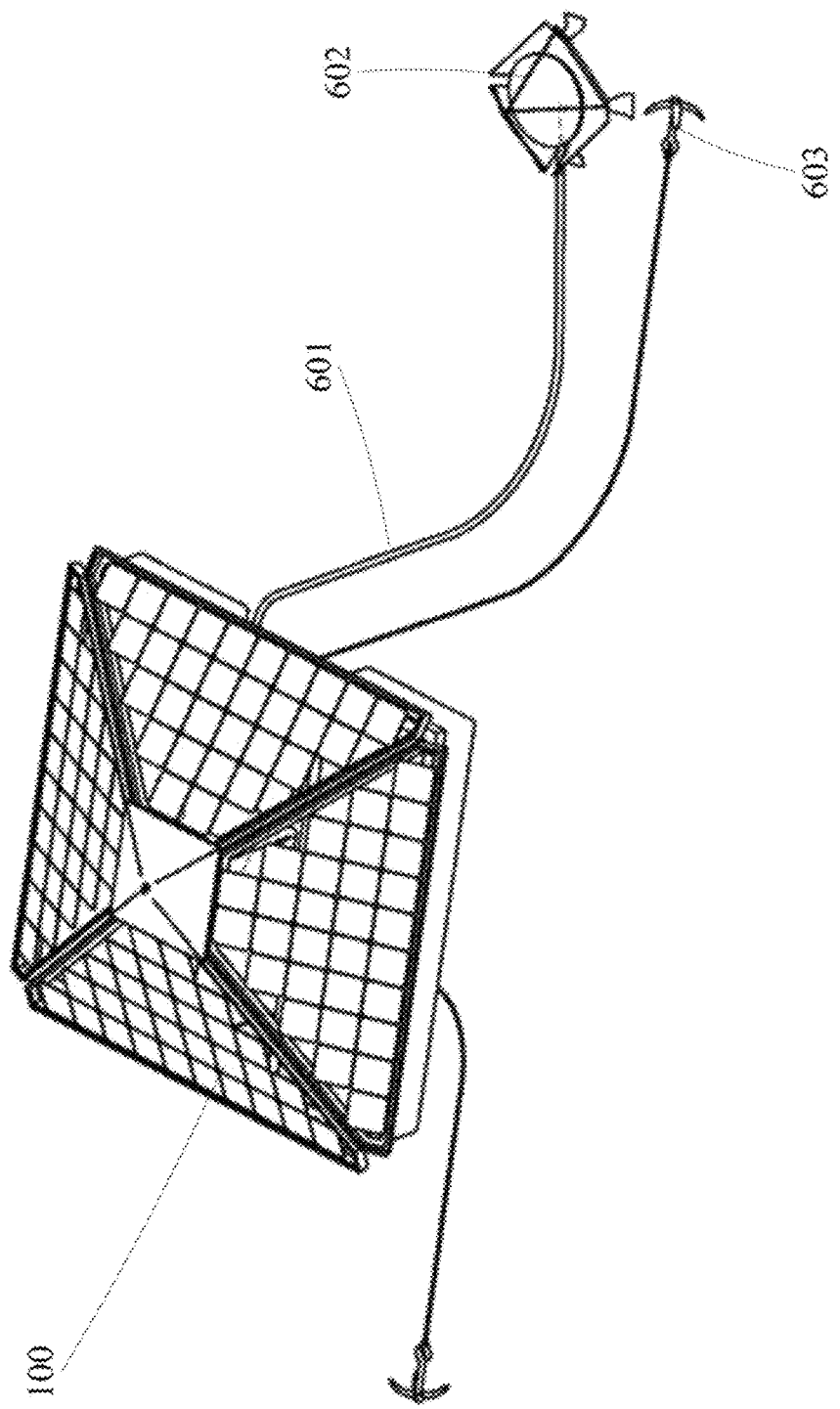
FIG. 6 depicts an example anchor of the floating solar system according to example embodiments.

In an example embodiment of a floating water aeration system depicted in FIG. 6, the encasement houses a linear diaphragm air compressor drive unit and control/inverter electronics system. The aeration system may be protected by the solar panels and secured to the mounting frame, i.e. the center frame and the lower base frame. An air outlet from the encasement may be connected to a hose with single or multiple diffusers attached to the other ends that are submerged. An air diffuser 602 may be connected to air hose 601 extended from the air compressor outlet. The floating solar system may be secured via anchor 603 to the bottom of the water feature. At least one anchor cable may couple the anchor to the floating base.

Figure 7:
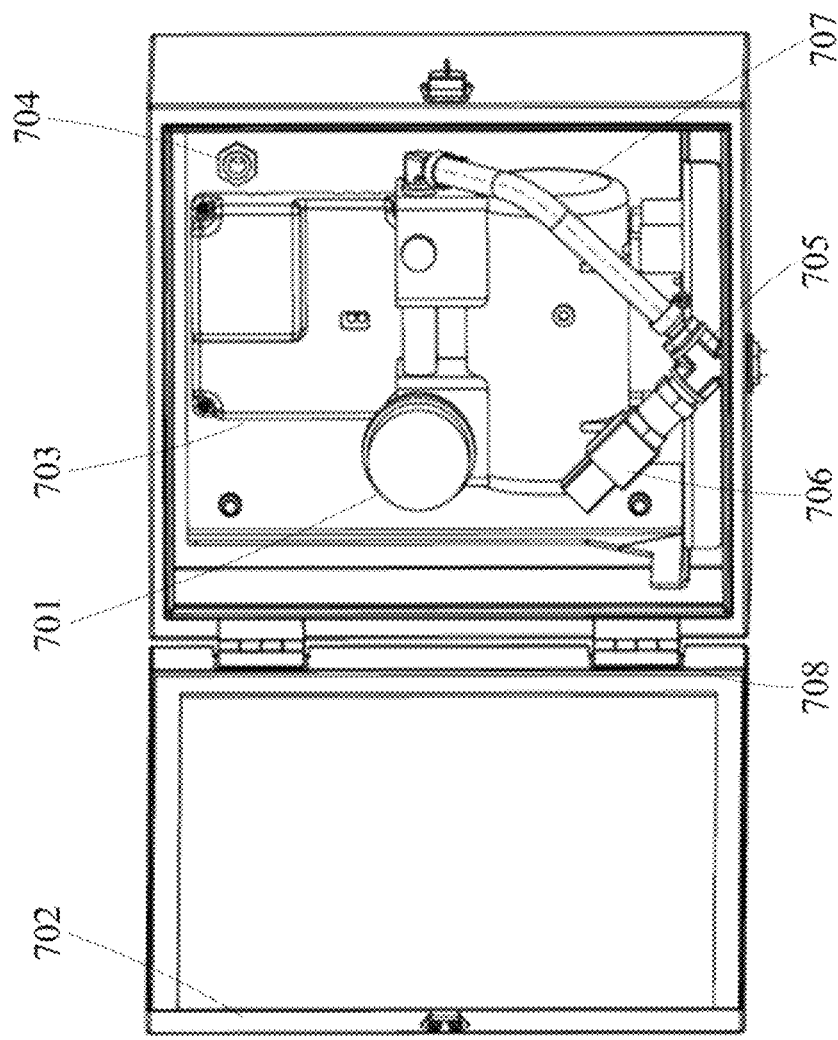
FIG. 7 depicts an example air compressor enclosure of the floating solar system according to example embodiments.
Figure 7:
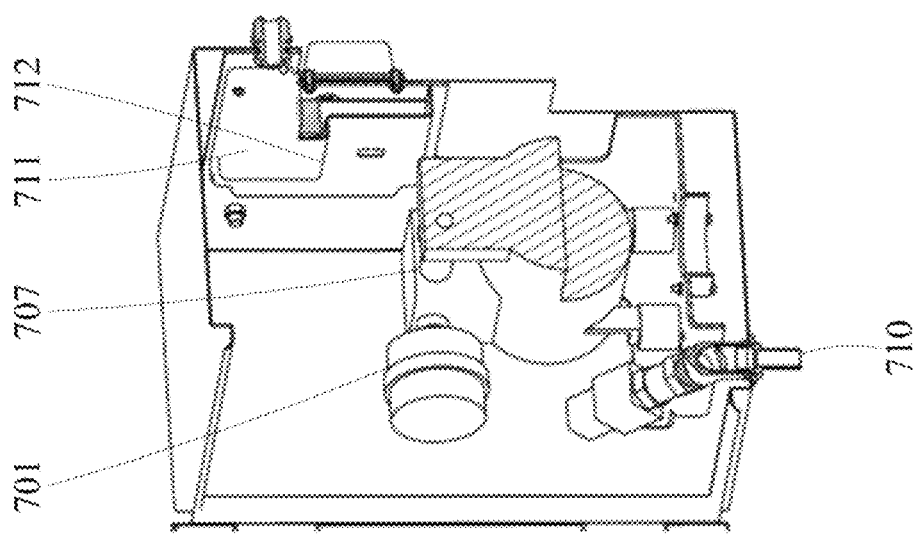

FIG. 7 depicts a brushless air compressor enclosure. The enclosure body may be sheet metal or fiber glass with frontward door 708 hinge connected to the body. The enclosure may be waterproof when closed. Inventer/controller 703 may be mounted to the back of the L-shape bracket. The air compressor 707 is secured to the L-shape bracket through isolators. Intake air flow may be through an external filter/muffler 702 and internal filter 701 which is on the air compressor 707. Both filters may function as a muffler to reduce noise. Compressor outlet air connects may be through an air hose 710 to the shaped connector 705. Pressure sensor 706 may monitor the working pressure and may be connected to the other entry of the Y shape connector. LED indicator 704 may indicate system conditions diagnosed by controller. Electronic board 711 may be completely potted inside plastic case 712 to protect it from dust and moisture.

Figure 8:
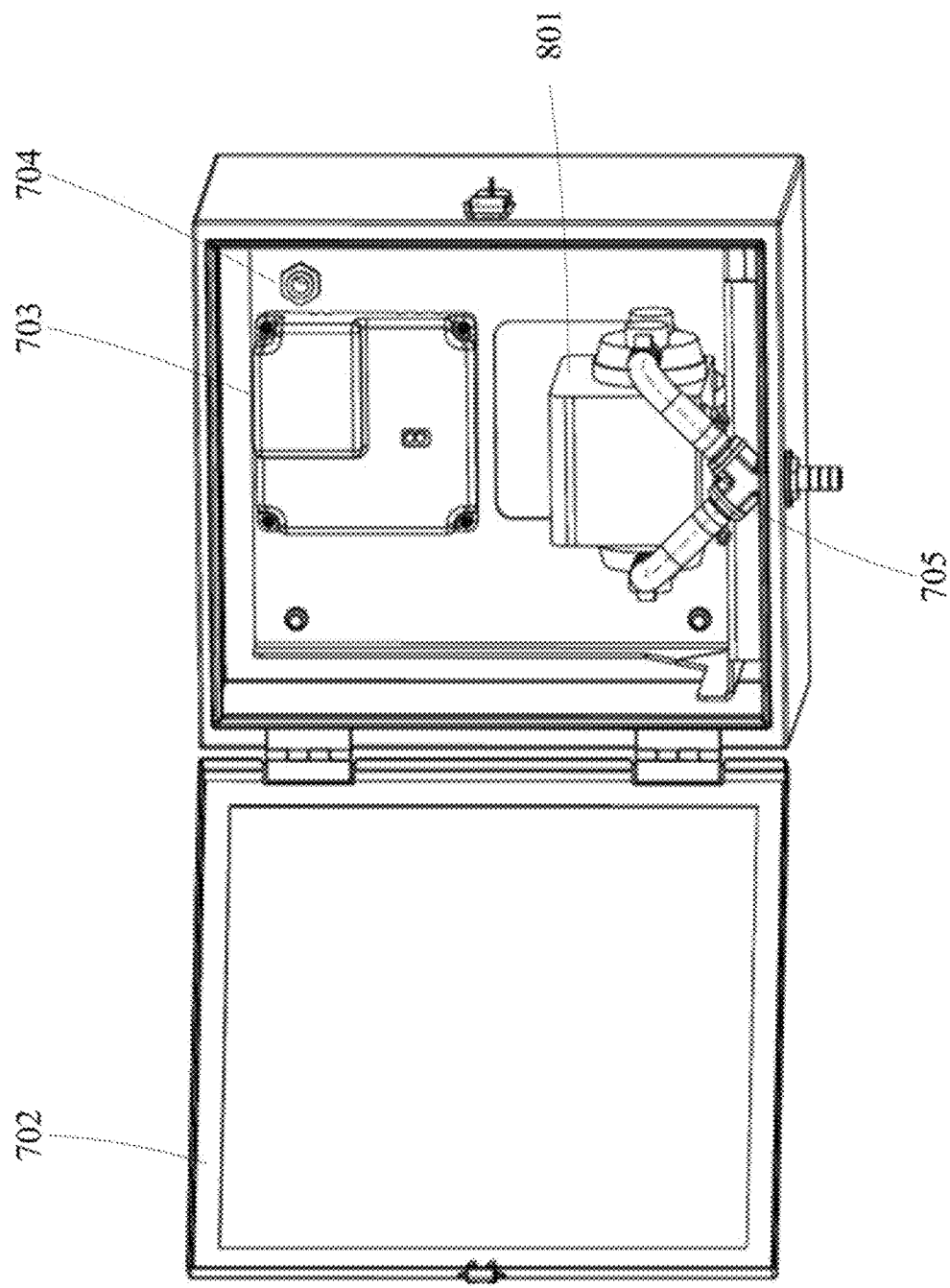
FIG. 8 depicts an example linear air compressor enclosure of the floating solar system according to example embodiments.

FIG. 8 depicts a linear air compressor enclosure. This enclosure may be similar to the brushless air compressor enclosure enclosing air compressor 801. The enclosure may have an external filter/muffler 702. The system may have an inverter/controller 703 and an LED indicator 704. A Micro Control Processor (MCP) may track the operating pressure without a pressure sensor. Two air compressor outlets may be connected through an air hose to the Y shaped connector 705.

Figure 9:
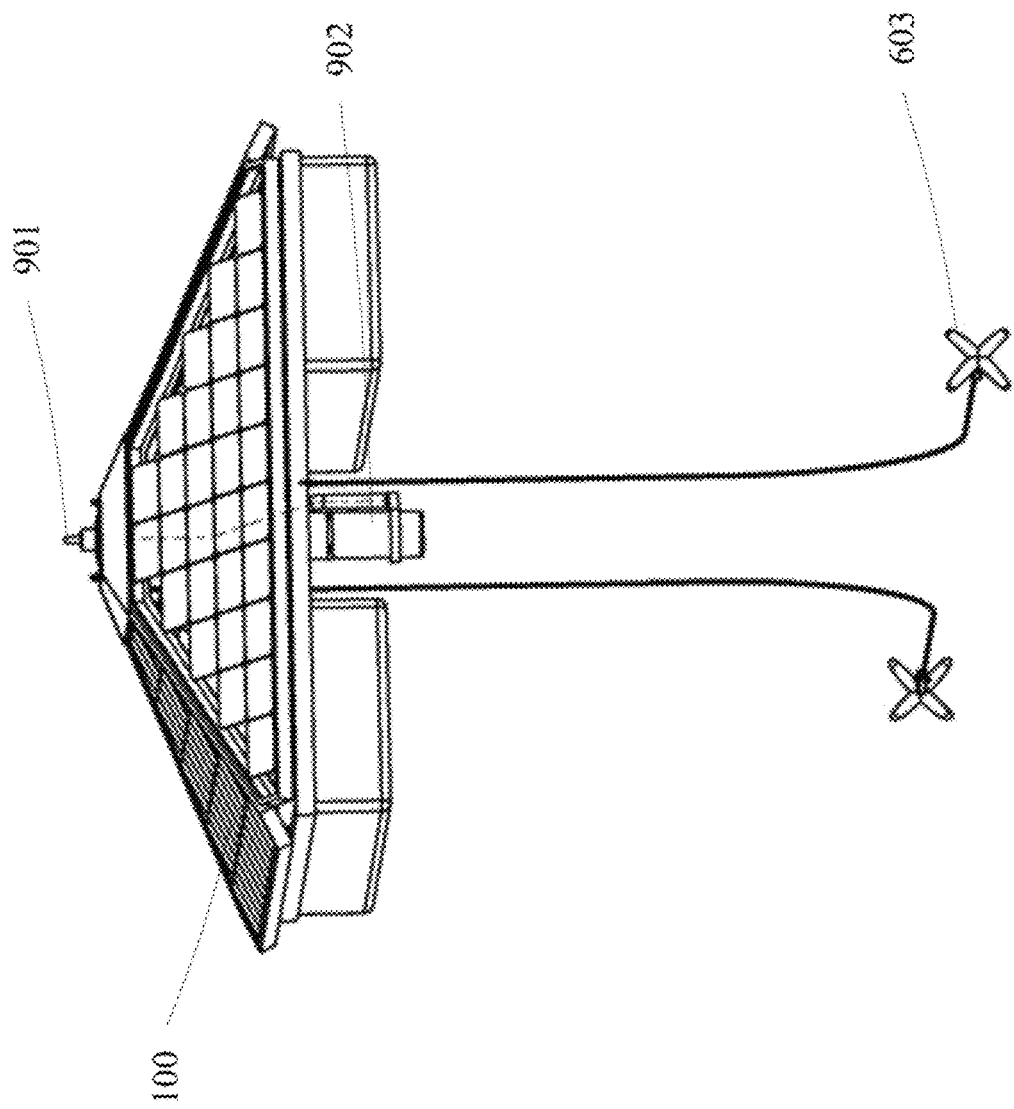
FIG. 9 depicts an example floating fountain of the floating solar system according to example embodiments.

FIG. 9 depicts an example layout of the floating fountain system. Submersible water pump 902 may be secured to the mounting frame of the floating solar system 100. Various fountain heads 901 may be attached to the top plate of the floating solar system and ma be connected via a water hose. The floating solar system may he located to a defined area with anchors 603.

Figure 10:
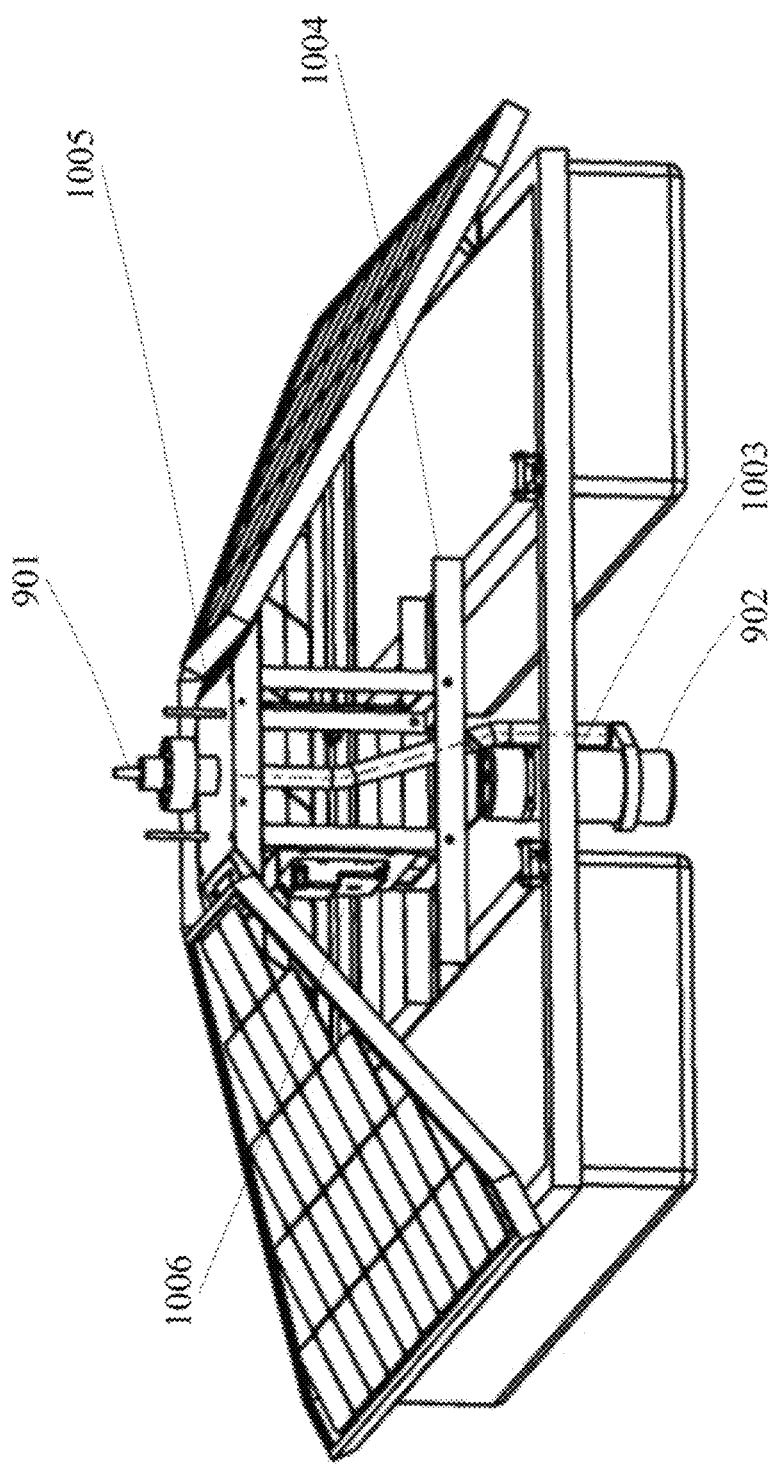
FIG. 10 depicts an example internal floating fountain layout of the floating solar system according to example embodiments.

FIG. 10 depicts an example of the internal features of the floating fountain system. Inverter/controller 1006 may be secured to the center frame. Submersible water pump 902 may be attached to a lower portion 1004 of the center frame. Interchangeable fountain heads 901 may be secured to the top plate 1005 of the center frame. A submersible water pump 902 may have a water intake at the bottom of the pump and an outlet connected with water hose 1003 coupled to the fountain head 901.

One example of the system may include an enclosure coupled to the center frame, a controller contained within the enclosure and a submersible water pump attached to the center frame. The system may additionally include a water hose connected to the submersible water pump and a fountain head connected to the water hose and mounted to the top plate.

Figure 11:
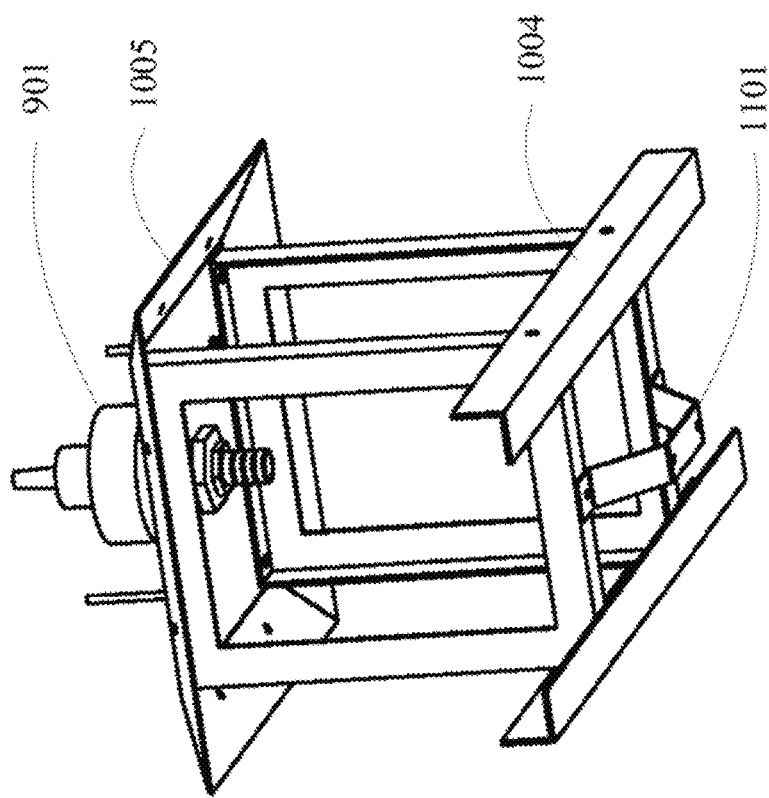
FIG. 11 depicts an example mounting support of the floating solar system according to example embodiments.

FIG. 11 showing detail of the center frame mounting support. Bracket 1101 secures the submersible water pump to the lower portion 1004 of the center frame. The center frame supports the top plate 1005 and a fountain head 901 may be secured to the top plate 1005.

Figure 12:
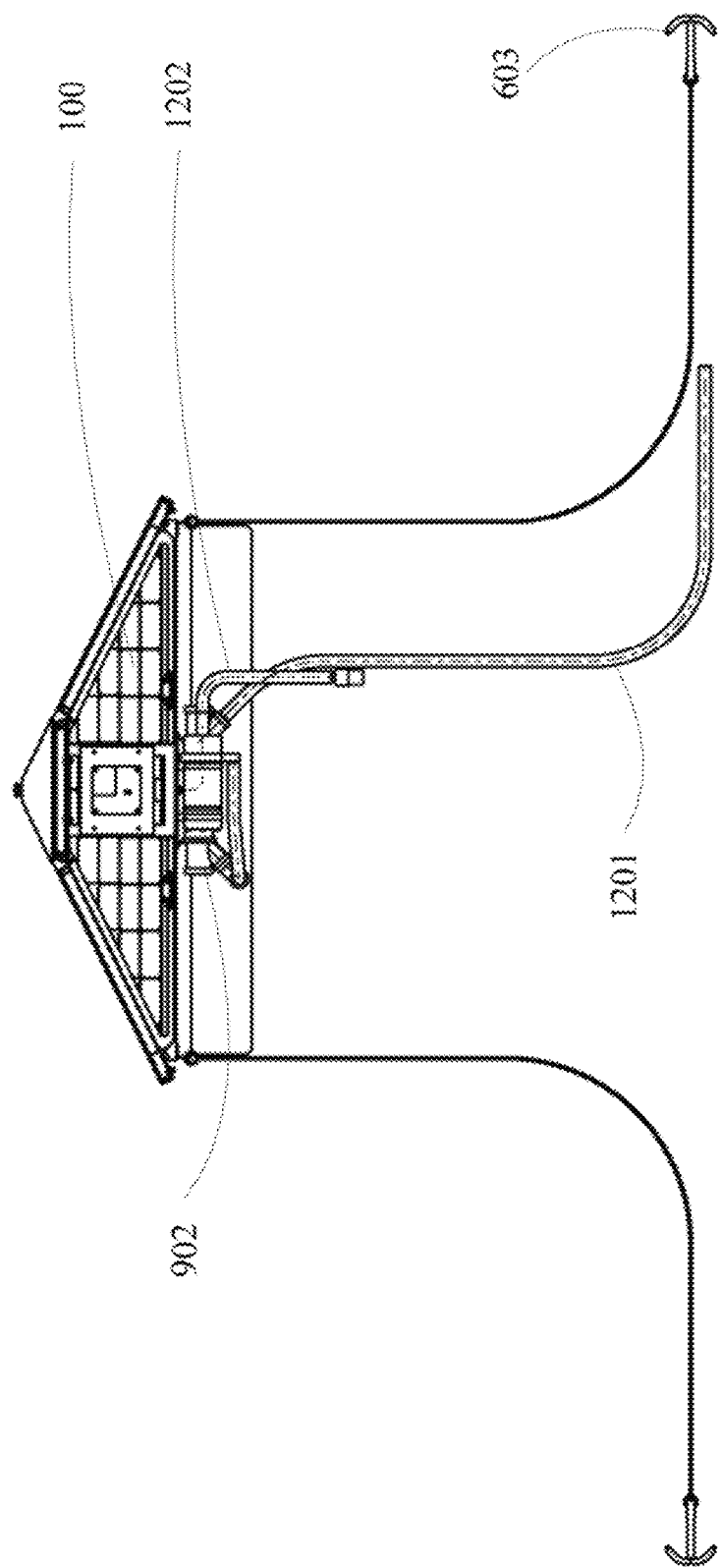
FIG. 12 depicts an example tine bubble and UV sterilizer of the floating solar system according to example embodiments.

FIG. 12 depicts the structure of the fine bubble and UV sterilizer system. At the base frame of the floating solar system 100, the submersible water pump 902 and the sterilize tube are attached. Water intake from tube 1201 goes through submersible water pump 902 and is mixed with fine air bubbles. It then flows through a UV sterilizer tube and then released to outlet tube 1202. The system is located to a defined area via anchors 603.

One example of the system may include an enclosure coupled to the center frame, a controller contained within the enclosure and a submersible water pump attached to the center frame. The system may also include a water hose connected to the submersible water pump and a UV light generator electrically coupled to the controller, wherein the UV light generator is capable of providing UV light to water within the water hose.

Figure 13:
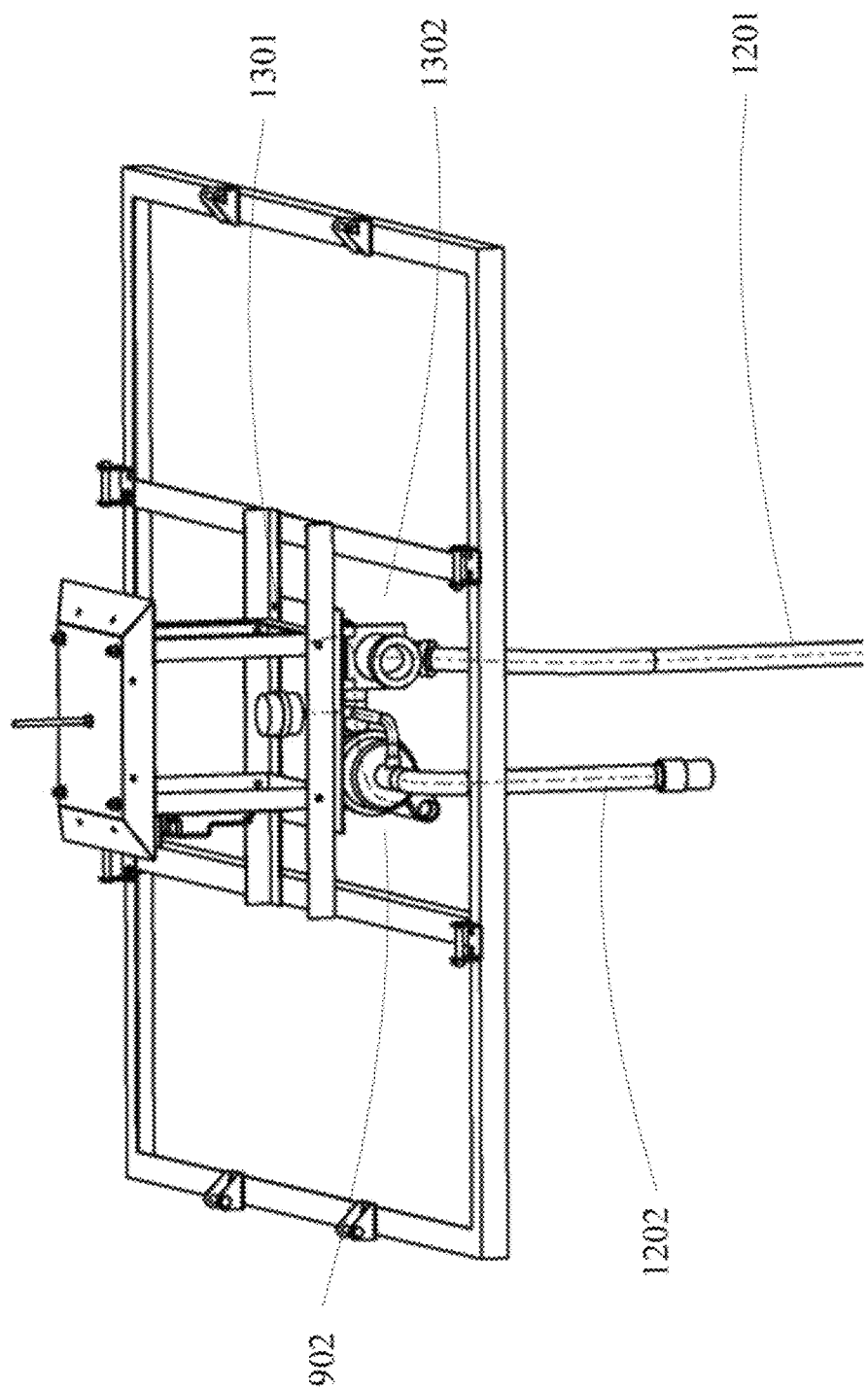
FIG. 13 depicts an example system mount of the floating solar system according to example embodiments.

FIG. 13 depicts an example layout of system mounting. Submersible water pump 902 and UV sterilizes assembly 1302 are attached via bolts to lower support plate 1301 of the center frame of the mounting support. In one embodiment the device is Z-shaped with a layer of rubber under the upper clamp to compensate for any dimensional variation of the solar panels. Water intake from tube 1201 goes through submersible water pump 902 and is mixed with fine air bubbles the water then flows through the UV sterilizes tube before released to outlet tube 1202.

Figure 14:
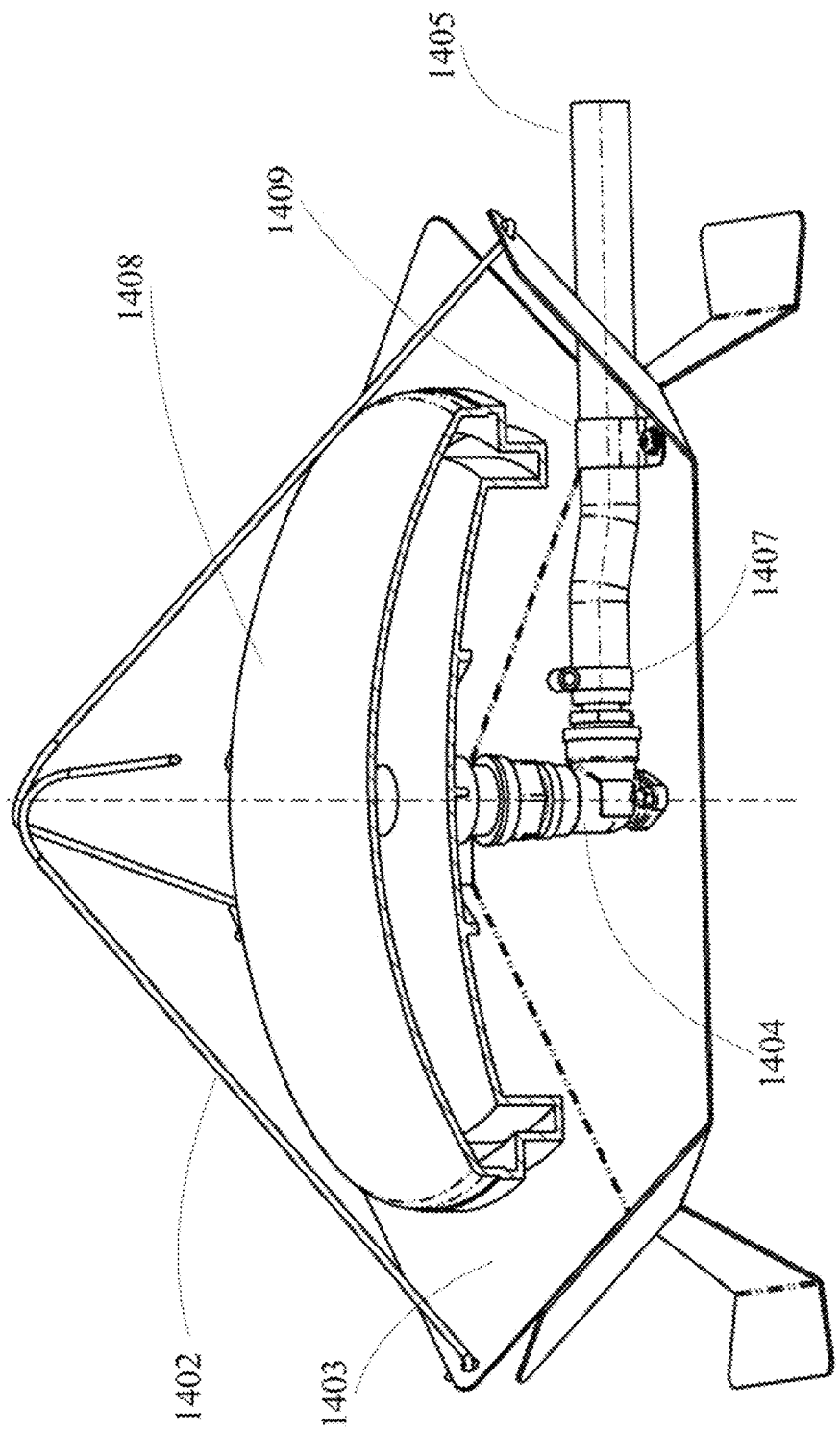
FIG. 14 depicts an example self-sinking diffuser of the floating solar system according to example embodiments.

FIG. 14 depicts an example single self-sinking diffuser system. Single or plural disk diffusers 1408 or an air tube may have an air intake connected to L-shaped connector 1404. The L-shaped connector 1404 may be secured with hose barb 1405. An air hose may be secured to hose barb 1405 with hose clamp 1407. The air hose may also be clamped to the base plate 1403 via a U-shape bracket 1409 to ensure that the air hose to hose barb 1405 connection remains tightly secured to the diffuser assembly. The L-shaped connector 1404 may also be bolted to the base plate 1403. If plural diffuser outlets are employed the L-shaped connector 1404 may be changed to a three way connector. The base plate 1403 may be stainless steel sheet metal. Four corners may be bent downward in the event that the diffuser is deployed to uneven surface. Four sides may be bent upward to enhance the balance when deployed underwater. Two handles 1402 allow the diffuser assembly to be carried and act as a floating indicator to indicate the location of the diffuser after deployment.

One example of the system may include an enclosure coupled to the floating base, an air compressor contained within the enclosure and an electronic controller electrically connected to the air compressor and contained within the enclosure. The system may additionally include an air hose connected to the enclosure, an air control valve having at least one intake and a plurality of outlets coupled to the air compressor and a diffuser coupled to the air hose distal from an outlet of the enclosure.

Another example of the system may include a self-sink diffuser coupled to the floating base, wherein the self-sink diffuser includes least one of a disk diffuser and a tube diffuser, wherein the floating lase has a side extrusion to guide the sells-sink diffuser and a U-shaped clamp to secure an air hose to the floating base.

Figure 15:
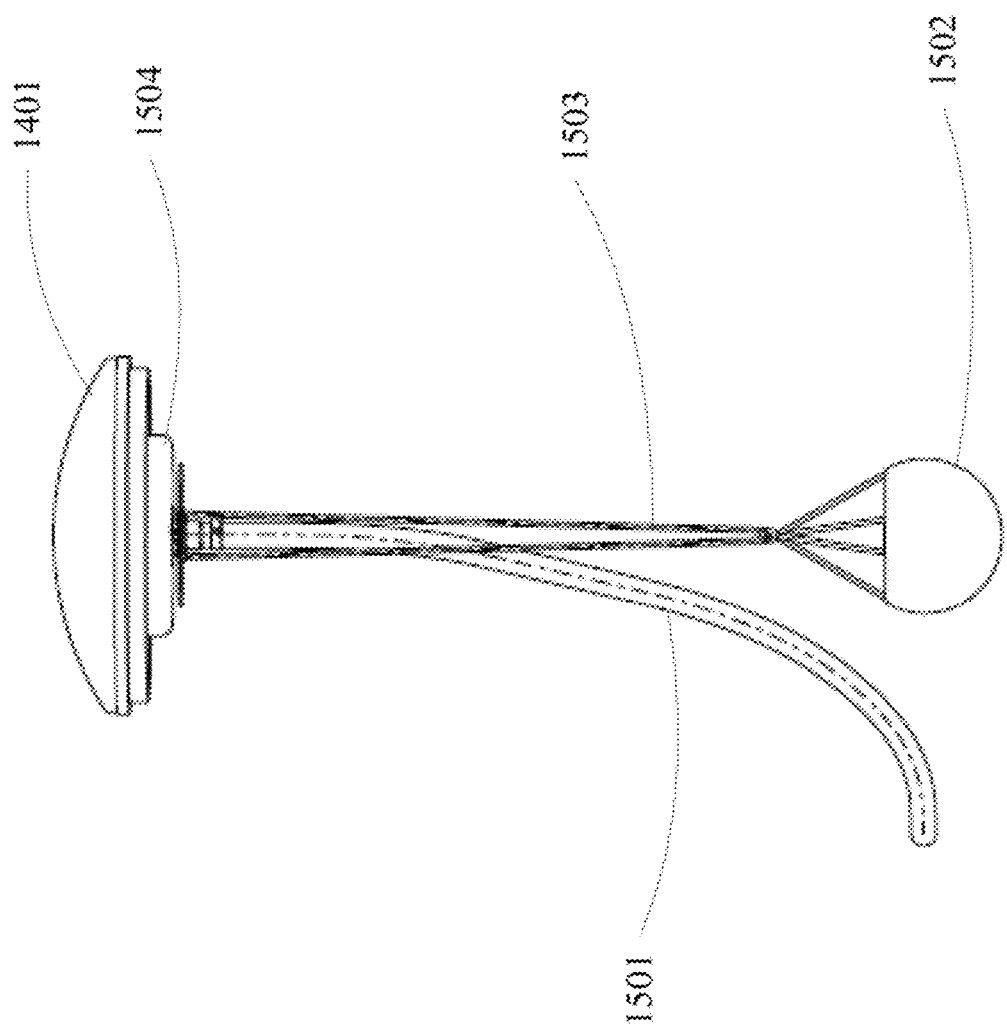
FIG. 15 depicts an example floating diffuser of the floating solar system according to example embodiments.

FIG. 15 depicts an example floating diffuser system. Single disk air diffuser 1401 or an air tube supported by buoyance 1504 may be employed. Plastic or metal wire net or bag 1502 may hold a balance weight and an adjustable length rope 1503 allows height adjustment. A self-sinking air hose 1501 may be attached to the diffuser air intake.

Another example system may include a floating diffuser coupled to the floating base, wherein the floating diffuser includes at least one of a disk diffuser and a tube diffuser, a floating buoyance coupled to the floating diffuser, an anchor weight connected to the floating buoyance and at least one of a net and a bucket to contain the anchor weight.

Figure 16:
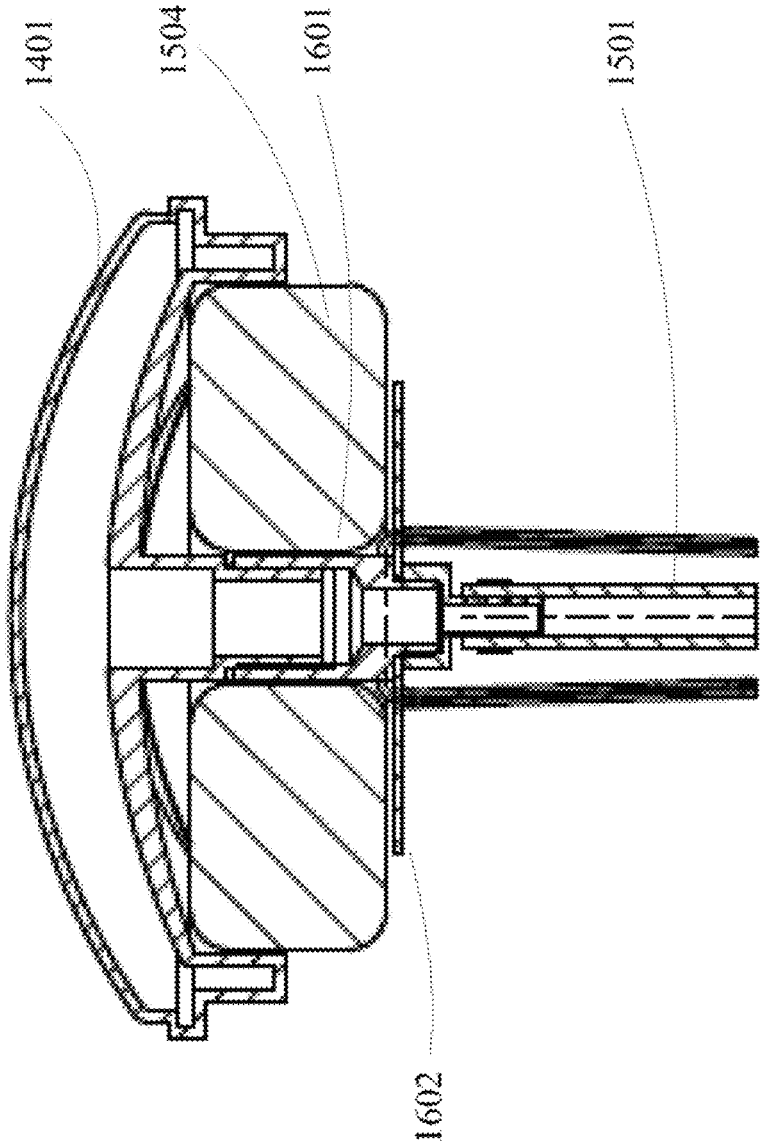
FIG. 16 depicts an example section view of the floating diffuser of the floating solar system according to example embodiments.

FIG. 16 depicts a detailed section view of an example floating diffuser system. Air diffuser 1401 and self-sinking air hose 1501 are attached together by connector 1601. Buoyance 1504 may be located between the bottom of the air diffuser 1401 and plate 1602 and an adjustable length rope may be connected to plate 1602.

Figure 17:
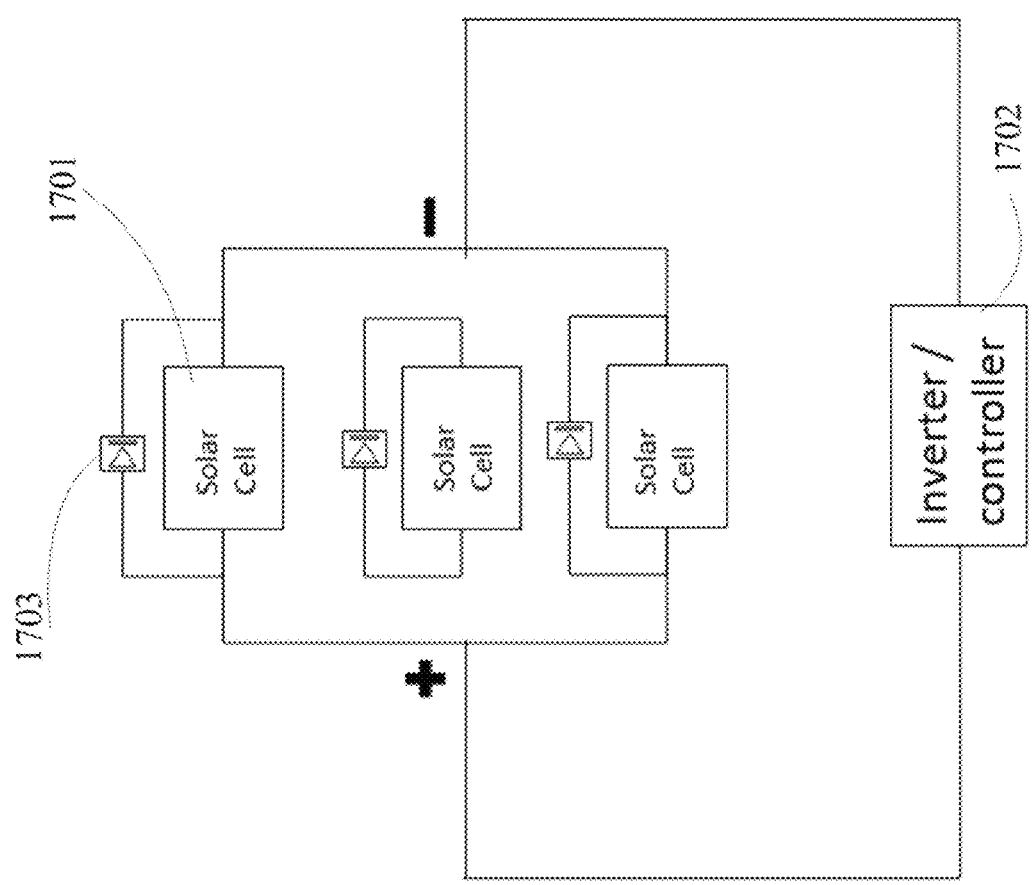
FIG. 17 depicts a first example of solar panel. connections of the floating solar system according to example embodiments.

FIG. 17 depicts an example schematic drawing of a three solar panel connection. The three solar panels 1701 may be connected in parallel and connected to the inverter/controller 1702. Each solar panel has a bypass diode 1703 to ensure solar energy output continuity will not be affected by an individual solar panel working conditions. At least one bypass diode may be electrically coupled to each of the three solar panels and the solar panels may be electrically coupled in parallel.

Figure 18:
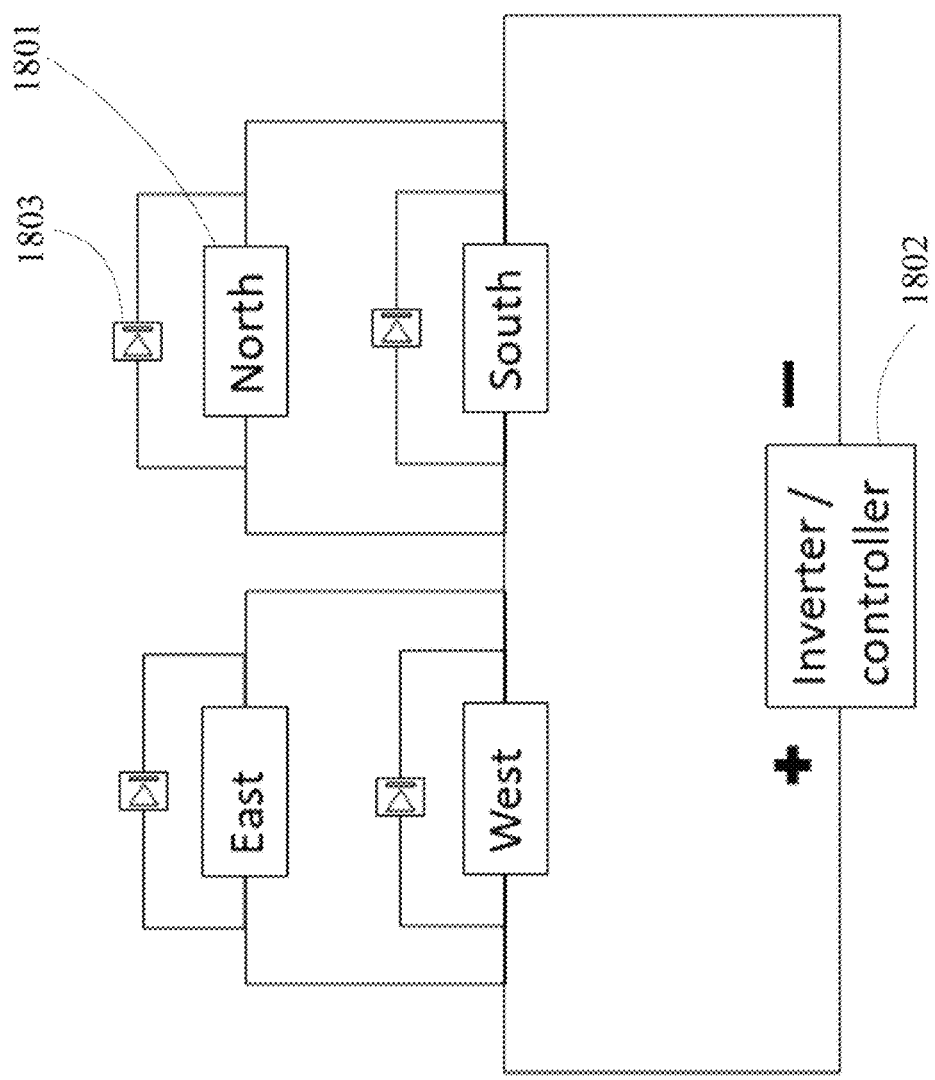
FIG. 18 depicts a second example of solar panel connections of the floating solar system according to example embodiments.

FIG. 18 is an example schematic drawing of a four solar panel connection. The orientation of the solar panels 1801 is indicated, opposite solar panels may be connected in parallel and then connected in series. The final outlets may be connected to the inverter/controller 1802. Each solar panel has a bypass diode 1803. At least one bypass diode may be electrically coupled to each of the four solar panels and the solar panels may be electrically coupled in parallel and in series.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently e.g., arranged in a different order, or partitioned in a different way all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are riot meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine e.g., his include the feminine and neuter gender e.g., her and its and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A floating solar system, comprising:
   a floating base comprising a buoyance, a lower base frame coupled to the buoyance, and a vertical center frame coupled to the lower base frame;
   an anchor coupled to the lower base frame;
   a plurality of solar panels affixed to the lower base frame and the center fran e to provide electrical power;
   a lightning rod coupled to the center frame;
   a lightning rod cap coupled to the lightning rod;
   a self-sink diffuser coupled to the floating base,
      a U-shaped clamp to secure an air hose to the floating base:
      wherein the self-sink diffuser includes at least one of a disk diffuser or a tube diffuser;
      wherein the floating base has a side extrusion to guide the self-sink diffuser: and
      wherein the self-sink diffuser comprises an air intake connected to a L-shaped connector bolted to a base plate.

2. The floating solar system of claim 1 wherein a shape of the floating base is one of square or round.

3. The floating solar system of claim 1 further comprising:
   a top plate coupled to the center frame; and
   at least one electro-mechanical encasement coupled to the center frame.

4. The floating solar system of claim 3 wherein at least one of the plurality of solar panels have an upper bracket for coupling to the center frame or the top plate and at least one lower hinge for mounting to the lower base frame, and wherein a shape of the plurality of solar panels is one of rectangular, triangular, or trapezoidal.

5. The floating solar system of claim 1 wherein the plurality of solar panels have a pyramidal shape of at least one of three or four sides, and the plurality of solar panels are tilted less than 40 degrees and facing either 120 or 90 degrees apart.

6. The floating solar system of claim 1 further comprising at least one bypass diode electrically coupled to each of at least three of the plurality of solar panels, and the at least three of the plurality of solar panels are electrically coupled in parallel.

7. The floating solar system of claim 1 further comprising at least one bypass diode electrically coupled to each of at least four of the plurality of solar panels, and the at;least four of the plurality of solar panels are electrically coupled in parallel and in series.

8. The floating solar system of claim I further comprising at least one anchor cable coupling the anchor to the floating base, Wherein the anchor cable has extra length to allow movement in variations in water level.

9. The floating solar system of claim. I further comprising:
an enclosure coupled to the floating base;
an air compressor contained within the enclosure;
an electronic controller electrically connected to the air compressor and contained within the enclosure;
an air hose connected to the enclosure;
an air control valve having at least one intake and a plurality of outlets coupled to the air compressor; and
an air diffuser coupled to the air hose distal from an outlet of the enclosure.

10. The floating solar system of claim 3 further comprising:
an enclosure coupled to the center frame:
a controller contained within the enclosure;
a submersible water pump attached to the center frame;
a water hose connected to the submersible water pump; and
a fountain head connected to the water hose and mounted to the top plate.

11. The floating solar system of claim 1, further comprising:
an enclosure coupled to the center frame;
a controller contained within the enclosure;
a submersible water pump attached to the center frame:
a water hose connected to the submersible water pump; and
a UV light generator electrically coupled to the controller, wherein the UV light generator is capable of providing UV light to water within the water hose.

12. The floating solar system of claim 1, further comprising:
a floating diffuser coupled to the floating base, wherein the floating diffuser includes at least one of a disk diffuser or a tube diffuser;
a floating buoyance threadably coupled to the floating diffuser;
an anchor weight connected to the floating buoyance; and
a net to contain the anchor weight.

13. The floating solar system of claim 1, wherein the lower base frame comprises an outer frame portion and an inner frame portion.

14. The floating solar system of claim 13, wherein the outer frame portion and the inner frame portion are made of either aluminum or stainless steel.

15. The floating solar system of claim 13, wherein solar panel hinge support pins may be mounted to the outer frame portion.

16. The floating solar system of claim 9, wherein the enclosure is made of either sheet metal or fiber glass.

17. The floating solar system of claim 9, wherein the enclosure is waterproof when closed.

18. The floating solar system of claim 9, wherein the air hose is connected to the enclosure via a Y-shaped connector.

19. The floating solar system of claim 9, wherein the air compressor is either a brushless air compressor or a linear air compressor.

20. The floating solar system of claim 10, wherein the submersible water pump comprises a water intake at the bottom of the pump and an outlet connected with the water hose coupled to the fountain head.

21. The floating solar system of claim 1, wherein the L-shaped connector is secured with a hose barb.

22. The floating solar system of claim 1, wherein the base plate is made of stainless steel sheet metal.

23. The floating solar system of claim 12, wherein the net is made of either plastic or metal wire.

* * * * *